(12) United States Patent
Watanabe

(10) Patent No.: US 8,189,226 B2
(45) Date of Patent: May 29, 2012

(54) PREVENTING DOUBLE INPUT OF SCANNED DOCUMENTS

(75) Inventor: Ryutaro Watanabe, Tokyo (JP)

(73) Assignee: Canon Kabushiki Kaisha (JP)

( * ) Notice: Subject to any disclaimer, the term of this patent is extended or adjusted under 35 U.S.C. 154(b) by 1074 days.

(21) Appl. No.: 11/565,896

(22) Filed: Dec. 1, 2006

(65) Prior Publication Data

US 2007/0136253 A1   Jun. 14, 2007

(30) Foreign Application Priority Data

Dec. 6, 2005 (JP) ................. 2005-352332

(51) Int. Cl.
*G06K 15/00* (2006.01)
(52) U.S. Cl. ..................... 358/1.16; 358/1.14
(58) Field of Classification Search .............. 358/1.14, 358/1.16
See application file for complete search history.

(56) References Cited

U.S. PATENT DOCUMENTS

2004/0125402 A1* 7/2004 Kanai et al. ............... 358/1.15
2006/0061802 A1* 3/2006 Ogura ....................... 358/1.15

FOREIGN PATENT DOCUMENTS

| JP | 6-162120 A | 6/1994 |
|---|---|---|
| JP | 2000-315241 A | 11/2000 |
| JP | 3412441 B2 * | 6/2003 |

* cited by examiner

*Primary Examiner* — King Poon
*Assistant Examiner* — Eric A Rust
(74) *Attorney, Agent, or Firm* — Rossi, Kimms & McDowell LLP

(57) ABSTRACT

An image forming apparatus (1000) is equipped with a scanner (1002) for scanning a paper document to thereby convert it to document data; a document memory (1008) for storing the document data; and a history memory (1007) for holding a history of user operations on the document data in association with whether or not the user operations are being managed as an object of control processing. A user operation upon document data is accepted from a operating unit (1001). If this user operation is being managed as an operation that is not an object of control processing in the history memory (1007), then the document data is processed based upon this user operation.

7 Claims, 7 Drawing Sheets

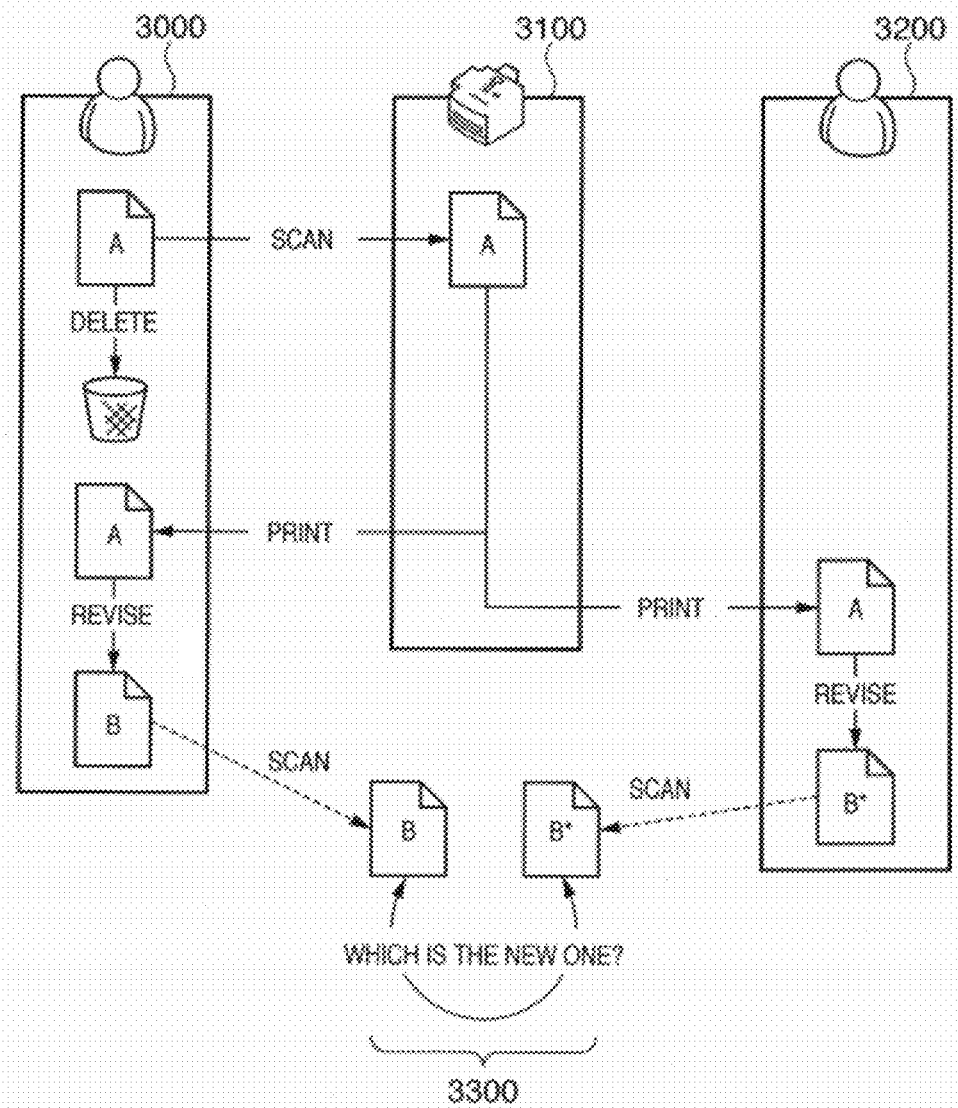

PREVENTING DOUBLE INPUT OF SCANNED DOCUMENTS

BACKGROUND OF THE INVENTION

1. Field of the Invention

The present invention relates to a document managing apparatus and method for managing document data.

2. Description of the Related Art

At present a transition is being made to a system in which large numbers of documents are managed with electronic data serving as original copies. Medical charts are no exception among these documents. Put into electronic form, these can benefit from the promotion of shared use and reductions in archiving space and cost. While the rapid digitization of medical charts per se is sought, on the other hand it is realized that paper, which lends itself to free description, serves as an important interface as a means for efficiently summing up random conversations with a patient, which often do not proceed logically, or as a means for appending additional information such as realistic representations of an affected part. For this reason, the state of the art is such that the digitization of medical charts is difficult.

In order to solve this problem, a method of putting a medical chart into electronic form while supporting free description by using a combination input/display device and pen tablet has been proposed (see the specification of Japanese Patent Application Laid-Open No. 6-162120). Further, a system in which a paper medical chart is written on and then scanned to thereby archive the chart has been proposed (see the specification of Japanese Patent Application Laid-Open No. 2000-315241).

Although the conventional chart management system of the kind described in Japanese Patent Application Laid-Open No. 6-162120 is such that the pen tablet is suited to the drawing of pictures, it does not lend itself to the writing of characters. Further, the system set forth in Japanese Patent Application Laid-Open No. 2000-315241 is disadvantageous in that it is not possible to add to or revise paper-based freely written data once it has been stored. For these reasons, a method being studied involves equipping a multifunction peripheral with a sophisticated document management function. With this method, editing is done in the form of a paper document. To achieve archiving and sharing, the paper document is scanned and is managed within the multifunction peripheral as an electronic document.

FIGS. 2A and 2B are diagrams useful in describing a method of utilizing the document management function of a multifunction peripheral to carry out editing in the form of a paper document, perform archiving and sharing of documents by scanning the paper document, and managing the document within the multifunction peripheral in the form of an electronic document.

First, reference will be had to FIG. 2A to mainly describe a case in which a medical chart is updated frequently. Here a document handled by a user 2000 is given expression in the form of paper, while a document stored by a multifunction peripheral 2100 is given expression in the form of electronic data. When a paper medical chart A is created by the user 2000, the chart is scanned and stored in the multifunction peripheral 2100 by the user in order to be archived and shared. An electronic medical chart A corresponding to the paper chart is formed by the multifunction peripheral 2100. Next, the user 2000 revises the paper medical chart A, thereby creating a paper medical chart B. In order to archive and share the chart, the user again scans the document and stores it in the multifunction peripheral 2100, thereby forming an electronic medical chart B. At this time the consistency of the electronic medical chart A and electronic medical chart B is judged by the multifunction peripheral 2100 based upon identifying information, and the electronic medical chart A within the multifunction peripheral is updated to the electronic medical chart B. Similar updating is repeated and a paper medical chart C and electronic medical chart C are formed.

Next, reference will be had to FIG. 2B to mainly describe a case where a medical chart is updated infrequently. Here a document handled by a user 2200 is given expression in the form of paper, while a document stored by a multifunction peripheral 2300 is given expression in the form of electronic data. When a paper medical chart A is created by the user 2200, the chart is scanned and stored in the multifunction peripheral 2300 by the user in order to be archived and shared. An electronic medical chart A corresponding to the paper chart is formed by the multifunction peripheral 2300. Thereafter, since no updating is scheduled for some time, the user 2200 discards the paper medical chart A. Next, if it becomes necessary for the user 2200 to edit the chart, then the user 2200 prints out the electronic medical chart A within the multifunction peripheral 2300 and forms a paper medical chart A. The user 2200 then revises the paper medical chart A and creates a paper medical chart B. In order to archive and share the chart, the user 2200 again scans the document and stores it in the multifunction peripheral 2300, thereby forming an electronic medical chart B. Thereafter, since no updating is scheduled for some time, the user 2200 discards the paper medical chart B.

Studies of whether or not the convenience of free description and the convenience of electronification of medical charts are both achieved by using these methods are in progress.

However, when both of the foregoing methods are used together, paper documents and electronic documents are managed in a complicated manner and it becomes difficult to maintain the consistency of electronic medical charts. For example, if a substitute physician makes a diagnosis because the physician in charge is absent, or if the same patient is diagnosed by an intern or supervising physician on the same day, a number of paper medical charts for editing will come into existence, causing difficulty in identifying the latest chart.

FIG. 3 is a diagram useful in describing an example of a case where there are a number of paper medical charts for editing. A document handled by users 3000 and 3200 is expressed in the form of paper, and a document stored by a multifunction peripheral 3100 is expressed by electronic data. First, when a paper medical chart A is created by the user 3000, the chart is scanned and stored in the multifunction peripheral 3100 by the user in order to be archived and shared. Thereafter, since no updating is scheduled for some time, the user 3000 discards the paper medical chart A. Next, if it becomes necessary for the user 3000 to edit the chart, the user 3000 prints out the electronic medical chart A within the multifunction peripheral 3100 and forms a paper medical chart A. Next, the user 3000 revises the paper medical chart A and creates a paper medical chart B. If it becomes necessary for the user 3200 to also edit the chart at the same time, the user 3200 prints out the electronic medical chart A within the multifunction peripheral 3200 and forms a paper medical chart A. Next, the user 3200 revises the paper medical chart A and creates a paper medical chart B*. If the users 3000 and 3200 subsequently attempt to update the electronic medical chart, they will try to scan in their paper medical charts. However, a problem 3300 occurs, namely that the newest paper medical charts cannot be determined.

Thus, as described above, in a method that involves editing in the form of a paper document, archiving and sharing of the document by scanning the paper document and managing the document within the multifunction peripheral as an electronic document, it is difficult to manage medical charts while maintaining consistency among the charts.

SUMMARY OF THE INVENTION

The present invention enables the provision of a document managing apparatus and method for managing document data in a unified fashion, managing the document data while maintaining consistency of the contents of the document, and doing so while enabling various users to operate on the document.

According to the present invention, the foregoing problem is solved by providing a document managing apparatus comprising:

a storage unit adapted to store document data;

a print designating unit adapted to cause an image, which represents document data that has been stored in the storage unit, to be printed on a print medium by a printing apparatus;

an updating unit adapted to update the document data, which has been stored in the storage unit, by reading the print medium, on which the image representing the document data has been printed based upon a designation by the print designating unit, by a reading apparatus; and a restricting unit adapted to restrict an update by the updating unit of a print medium other than the print medium on which the image has been printed in response to the designation by the print designating unit, the restriction being imposed after the image representing the document data has been printed based upon the designation by the print designating unit.

According to another aspect of the present invention, the foregoing problem is solved by providing a document managing apparatus comprising:

a storage unit adapted to store document data;

a print designating unit adapted to cause an image, which represents document data that has been stored in the storage unit, to be printed on a print medium by a printing apparatus;

an updating unit adapted to update the document data, which has been stored in the storage unit, by reading the print medium, on which the image representing the document data has been printed based upon a designation by the print designating unit, by a reading apparatus; and a notification unit, wherein in a case where after the image representing the document data has been printed based upon the designation by the print designating unit, another print designation by the print designating unit is made before an update by the updating unit, the notification unit is adapted to give notification of this fact.

In still another aspect of the present invention, the foregoing problem is solved by providing a document management method comprising the steps of:

storing document data in a storage device;

causing an image, which represents document data that has been stored at the storage step, to be printed on a print medium by a printing apparatus;

updating the document data, which has been stored at the storage step, by reading the print medium, on which the image representing the document data has been printed based upon a designation at the print designating step, by a reading apparatus; and restricting an update at the updating step of a print medium other than the print medium on which the image has been printed in response to the designation at the print designating step, the restriction being imposed after the image representing the document data has been printed based upon the designation at the print designating step.

Further features of the present invention will become apparent from the following description of exemplary embodiments with reference to the attached drawings.

BRIEF DESCRIPTION OF THE DRAWINGS

FIG. 3 is a diagram useful in describing an example of a case where a number of paper medical charts for editing come into existence;

DESCRIPTION OF THE EMBODIMENTS

Preferred embodiments of the present invention will now be described in detail with reference to the drawings. It should be noted that the relative arrangement of the components, the numerical expressions and the numerical values set forth in these embodiments do not limit the scope of the present invention unless it is specifically stated otherwise.

First Embodiment

Figure 1:
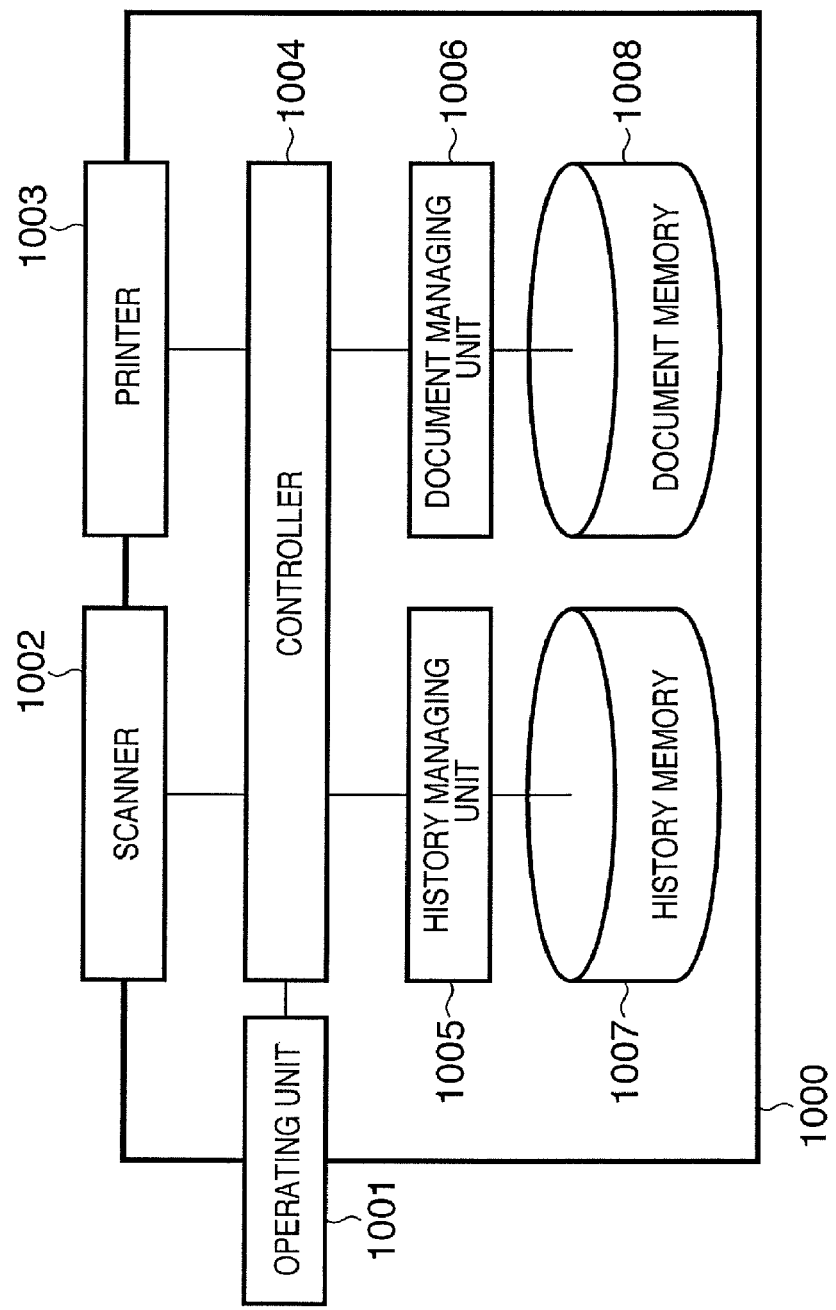
FIG. 1 is a block diagram illustrating the configuration of an image forming system according to a first embodiment of the present invention.
Figures 2A, 2B:
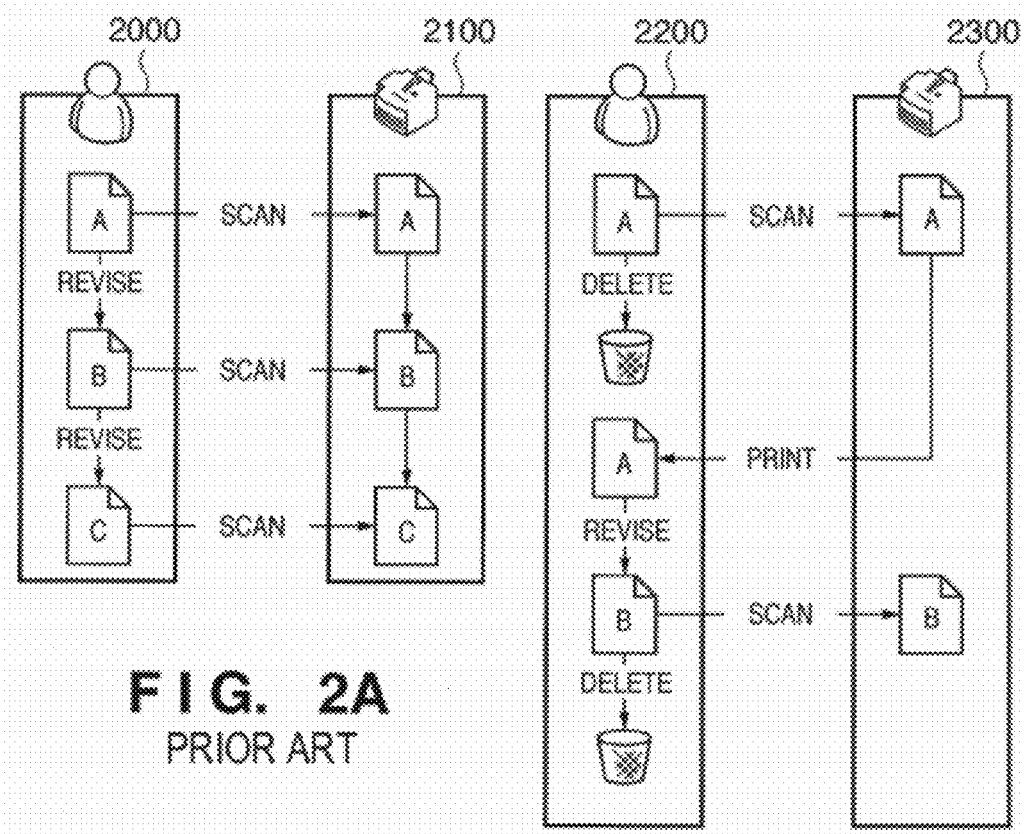
FIGS. 2A and 2B are diagrams useful in describing a method of utilizing the document management function of a multifunction peripheral to carry out editing in the form of a paper document, perform archiving and sharing of documents by scanning the paper document, and managing the document within the multifunction peripheral in the form of an electronic document.

FIG. 1 is a block diagram illustrating the configuration of an image forming system according to a first embodiment of the present invention. This image forming system is constructed using a digital multifunction peripheral (image forming apparatus) 1000.

As shown in FIG. 1, the system includes an operating unit 1001 through which the system accepts user operations and transmits these user operations to a controller 1004. A scanner 1002 transmits a generated image to the controller 1004. A printer 1003 forms an image accepted from the controller 1004.

The controller 1004 executes processing such as scanning and printing based upon input information from the operating unit 1001, supplies the operating unit 1001 with information such as device status and job status, and processes generated electronic data and a history of operations performed on the data. A history managing unit 1005 manages and holds a history of a series of operations in accordance with an instruction from the controller 1004, and a document managing unit 1006 manages electronic data in accordance with an instruction from the controller 1004. A history memory 1007 is a location at which the operation history is stored, and a document memory 1008 is a location at which electronic data is stored.

Figure 4:
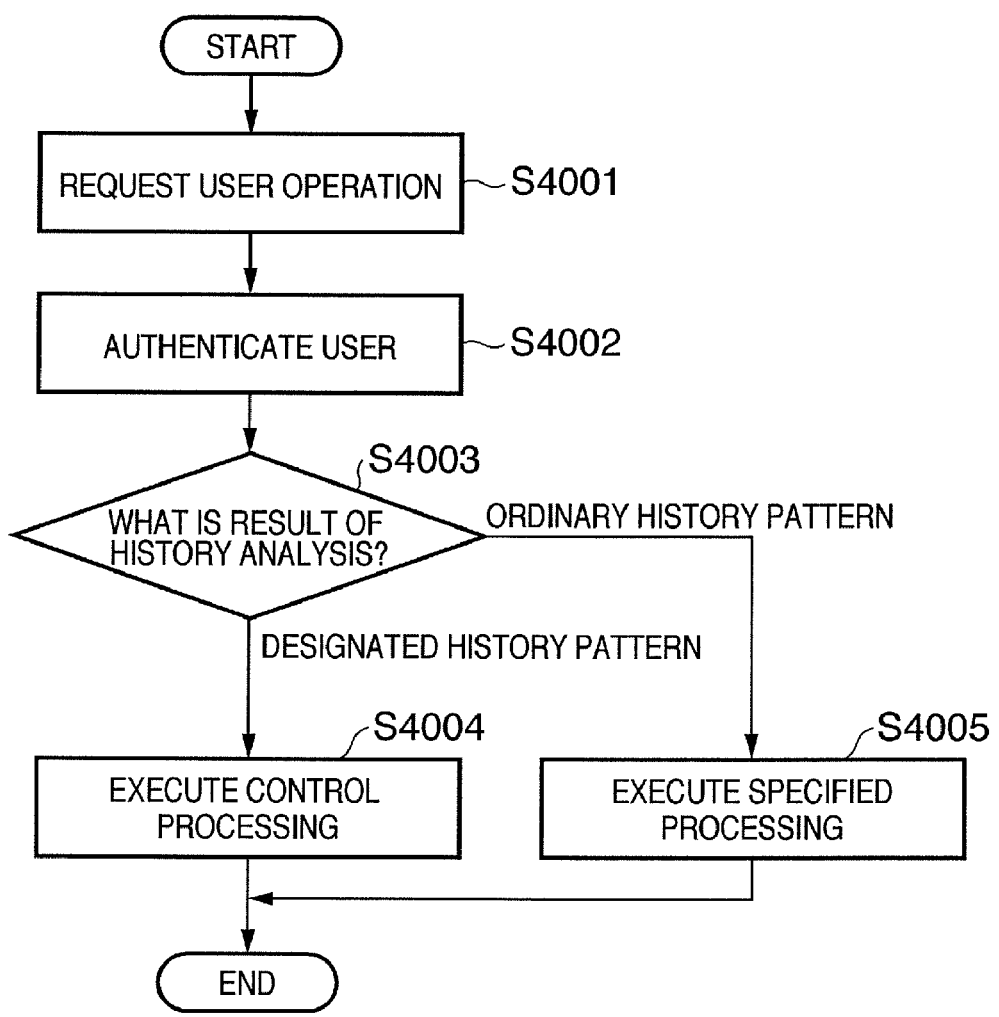
FIG. 4 is a flowchart useful in describing the flow of control processing based upon operation history of the image forming system according to the first embodiment.

FIG. 4 is a flowchart useful in describing the flow of control processing based upon operation history in the image forming system according to the first embodiment. First, by using the operating unit 1001, a user operation request is generated and the request is delivered to the controller 1004 (step S4001). Next, upon accepting the user operation request, the controller 1004 authenticates the user who issued the operation request, determines whether the user has appropriate authority for operation for operation execution and decides the requesting user from this point onward (step S4002).

After determining by authentication that the user can execute an operation, the controller 1004 accesses the history memory 1007 through the history managing unit 1005 and searches the history memory 1007 for a history of operations on the document that is the target of an operation (step S4003). If the result of the search is that the operation history is a pattern to undergo control processing (a designated history pattern), control proceeds to step S4004. If this is not the case and the operation history is an ordinary history pattern, then control proceeds to step S4005.

If it has been determined at step S4003 that the pattern is to undergo control processing, then control processing is executed at step S4004 and, at the same time, the user is notified of the result of processing through the operating unit 1001. On the other hand, if it has been determined at step S4003 that the pattern is not to undergo control processing, then the operation requested by the user is executed by operating the scanner 1002, printer 1003 and document managing unit 1006 at step S4005.

Figure 5:
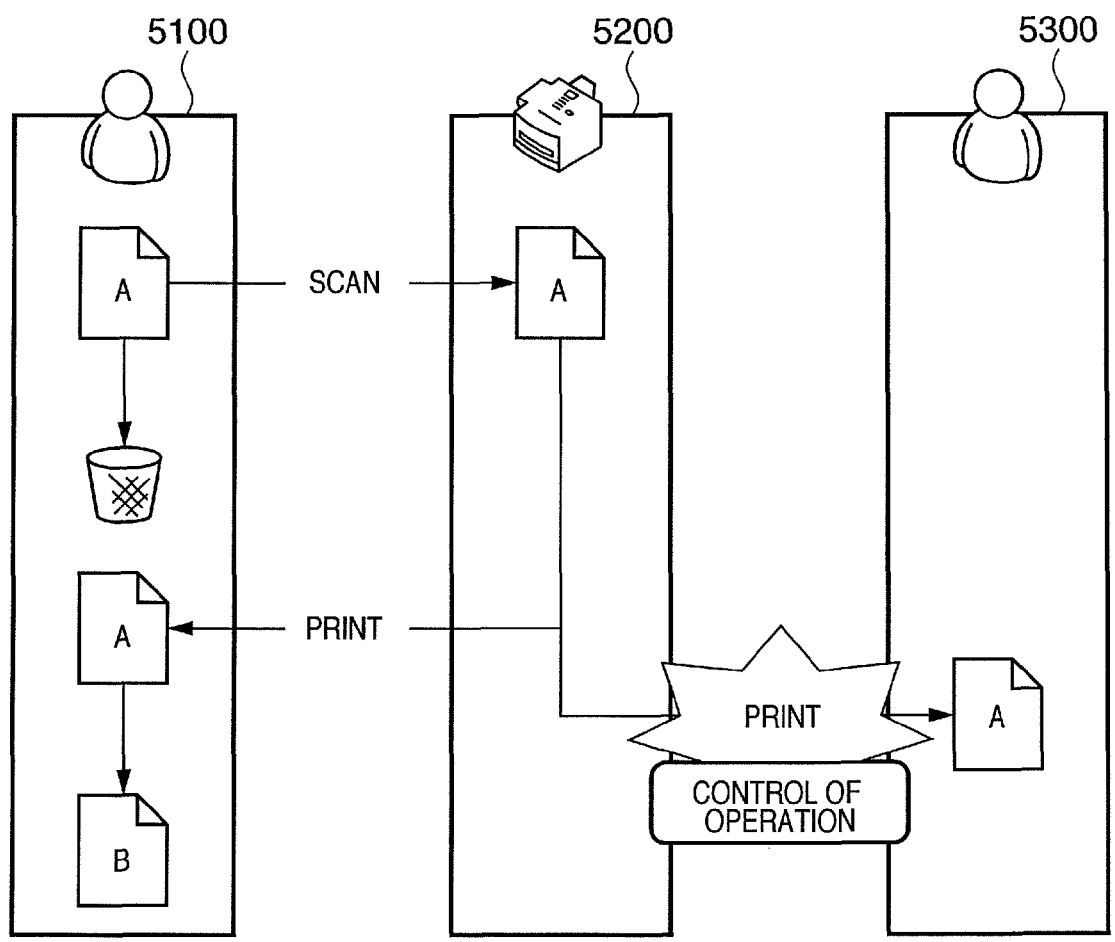
FIG. 5 is a diagram useful in describing control content in an image forming system according to the first embodiment of the present invention.

Next, specific processing that is in accordance with the foregoing flowchart will be described. A user operation request is assumed to be a print request, and a designated operation history pattern is assumed to a print operation history based upon an unspecified user B, without the entry of a scan operation history of an unspecified user A following storage of a print operation history based upon the unspecified user A. FIG. 5 is a diagram useful in describing the flow of processing.

First, a user 5100 creates a paper medical chart A and stores this as an electronic medical chart A in the document memory 1008 of a multifunction peripheral 5200 via the scanner 1002. At this time the scanning operation by the user 5100 is logged in the history memory 1007 as history. The paper medical chart A is then discarded by the user, etc.

At a later time, in that the user 5100 may perform editing, the user 5100 uses the operating unit 1001 to instruct printout from the printer 1003 in order that paper medical chart A may be obtained from electronic medical chart A (step S4001). When this is done, a screen for authenticating the user is displayed on the operating unit 1001 and the fact that the user is the user 5100 is recognized from the content of the input (step S4002). Next, at step S4003, the operation history is analyzed. Since only scanning by the user 5100 has been logged in the history, control proceeds to step S4005 and the electronic medical chart A is printed out. At the same time, the printing operation by the user 5100 is logged in the history memory 1007 as history. If under these conditions a user 5300 requests the controller 1004 for a printing operation via the operating unit 1001, user authentication is performed and the user 5300 is authenticated at step S4002 in a manner similar to that described above. The operation history is then analyzed at step S4003, and it becomes clear from the history stored in the history memory 1007 that the electronic medical chart A was not scanned after it was printed by the user 5100.

That is, since this fits the designated history pattern, control proceeds to step S4004. Here the fact that the printout by the user 5300 is the target of operation control is determined by the controller 1004, the print request from the user 5300 is not allowed and printout of the electronic medical chart A is inhibited.

Thus, in accordance with this embodiment, in a case where there is the possibility that an unspecified user A has performed editing after printing, printout for the purpose of editing by an unspecified user B can be restricted. Accordingly, multiple copies of the same paper medical chart that should be the original will no longer come into existence and inconveniences no longer occur when an electronic medical chart is updated.

Second Embodiment

Figure 6:
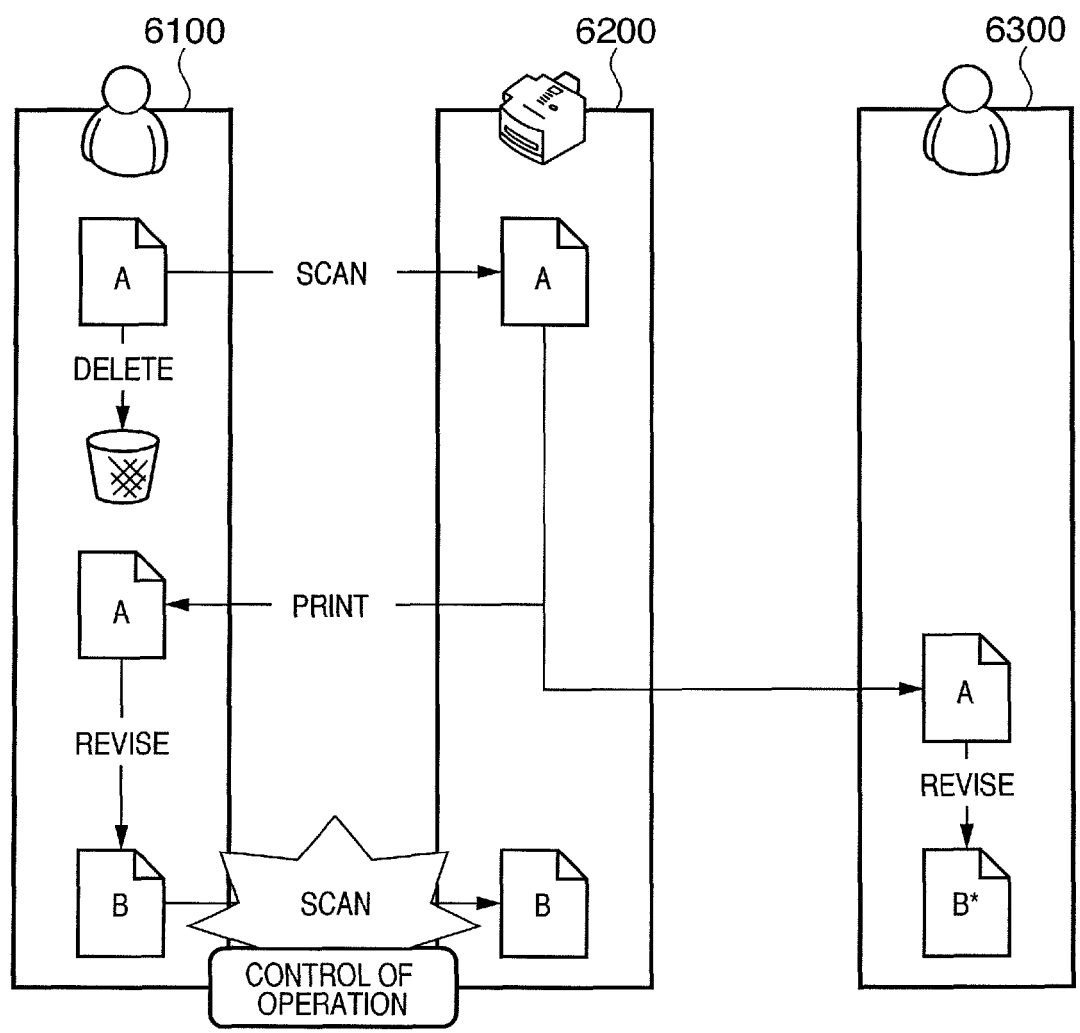
FIG. 6 is a diagram useful in describing control content in an image forming system according to a second embodiment of the present invention.

In this embodiment, the user operation request is assumed to be a scan request in the first embodiment, and the designated operation history pattern is assumed to a scan operation by an unspecified user A following a print operation history based upon an unspecified user B, which is subsequent to a print operation history by the unspecified user A. FIG. 6 is a diagram useful in describing control content in an image forming system according to the second embodiment of the present invention. The description that follows will center mainly upon the difference between this embodiment and the first embodiment.

First, a user 6100 creates a paper medical chart A and stores this as an electronic medical chart A in the document memory 1008 of a multifunction peripheral 6200 via the scanner 1002. At this time the scanning operation by the user 6100 is recorded in the history memory 1007 as a history. The paper medical chart A is then discarded by the user.

At a later time, in order that the user 6100 may perform editing, the user 6100 uses the operating unit 1001 to instruct printout from the printer 1003 in order that paper medical chart A may be obtained from electronic medical chart A (step S4001). When this is done, a screen for authenticating the user is displayed on the operating unit 1001 and the fact that the user is the user 6100 is recognized from the content of the input (step S4002). Next, at step S4003, the operation history is analyzed. Since only scanning by the user 6100 has been logged in the history, control proceeds to step S4005 and the electronic medical chart A is printed out. At the same time, the fact that printing was performed by the user 6100 is logged in the history memory 1007 as history. Thereafter, in order for a user 6300 also to perform editing, the user 6300 prints out the electronic medical chart A as the paper medical chart A using the printer 1003. The printing operation by the user 6300 is logged in the history memory 1007 as history. In other words, although printout of the electronic medical chart A by user 6100 has been stored in the history memory 1007 as the latest history, printout by user 6300 also is allowed. Under these conditions, the user 6100 requests the controller 1004 for a scanning operation via the operating unit 1001 (step S4100). User authentication at step S4200 is performed and analysis of the history based upon the history memory 1007 is carried out at step S4003. It is clear that after printing was performed by user 6100, printing was performed by user 6300. The fact that the scanning operation by the user 6100 is the target of operation control is determined by the controller 1004 and the scan request from the user 6100 is inhibited. On the other hand, if user 6300 has used the operating unit 1001 to perform an operation that does not involve the editing of the paper medical chart A, then control proceeds to step S4005 and scanning is allowed. That is, since the chart that results from scanning of paper medical chart A by the user may be updated from the electronic medical chart A in the document memory 1008, the scan request from user 1006 is allowed, scanning of paper medical chart A is performed and electronic medical chart A in document memory 1008 is updated.

Thus, in a case where there is the possibility that an unspecified user B has performed editing after printing has been performed by an unspecified user A, updating by the unspecified user A can be restricted. Updating can be allowed if it is determined that user B has not performed editing.

Third Embodiment

Figure 7:
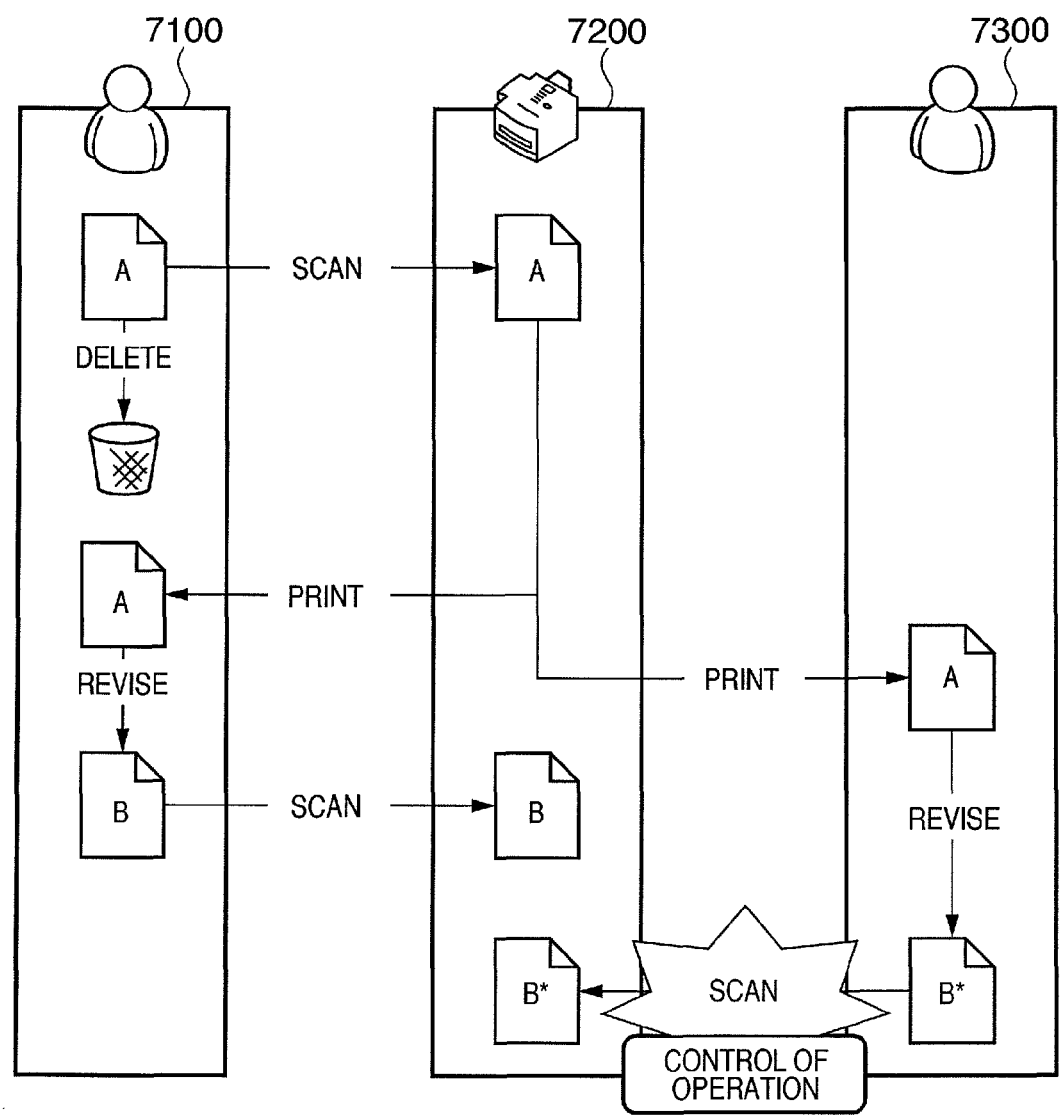
FIG. 7 is a diagram useful in describing control content in an image forming system according to a third embodiment of the present invention.

In this embodiment, the user operation request is assumed to be a scanning request in the first embodiment, and the designated operation history pattern is assumed to a scanning operation based upon an unspecified user B following a scan operation history based upon an unspecified user A, which is subsequent to a print operation history by the unspecified users A and B. FIG. 7 is a diagram useful in describing control content in an image forming system according to the third embodiment of the present invention. The description that follows will center mainly upon the difference between this embodiment and the first embodiment.

First, a user 7100 creates a paper medical chart A and stores this as an electronic medical chart A in the document memory 1008 of a multifunction peripheral 6200 via the scanner 1002. At this time the scanning operation by the user 7100 is recorded in the history memory 1007 as a history. The paper medical chart A is then discarded by the user.

At a later time, in order to perform editing, users 7100 and 7300 print out the electronic medical chart A as the paper medical chart A in no special order using the printer 1003. At the same time, the printing operations by the users 7100 and 7300 are recorded in the history memory 1007 as history. Thereafter, assume that user 7100 edits the paper medical chart A to obtain paper medical chart B and then scans paper medical chart B to obtain electronic medical chart B. At the same time, scanning by user 7100 is recorded in history memory 1007 as history. Under these conditions, user 7300 requests a scanning operation of the controller 1004 via the operating unit 1001 (step S4001). User authentication at step S4200 is performed and analysis of the history based upon the history memory 1007 is carried out at step S4003. It is clear that after printing was performed by users 7100 and 7300, scanning was performed by user 7100. The fact that the scanning by the user 7300 is the target of operation control is determined by the controller 1004 and the scanning request by the user 7300 is inhibited. In other words, the scanning of paper medical chart B that user 7300 is attempting to scan is inhibited because it does not reflect the revisions made to paper medical chart B that was scanned by user 7100.

Thus, it is possible to restricting the update by unspecified user B for which there is the danger that the update by unspecified user A will be deleted because unspecified user A performed the update after unspecified users A and B performed printing.

Fourth Embodiment

In this embodiment, the method of controlling operation requested by a user is implemented by displaying a warning message in the first to third embodiments described above.

First, if a user requests each operation through the operating unit 1001, the controller 1004 determines whether the operation is a target of control that fits the designated history pattern. If it determined that operation requested by the user is the target of control, then a message suggesting that there is a possibility that the operation requested by the user will cause branching of the medical chart, namely a warning message indicating the danger that multiple copies of the chart may be produced by updating, is displayed on the operating unit 1001. In the first to third embodiments, it is so arranged that processing regarding an operation request is inhibited. However, in the event that there is an instruction to go forward with processing (updating of an electronic medical chart by scanning or printout of an electronic medical chart) in response to the warning message, then the processing is executed.

Thus, in a case where there is the possibility that one's own requested operation will cause branching of a chart, the user requesting the operation can ascertain this in advance.

Fifth Embodiment

In the embodiments described above, under what conditions a paper medical chart has been printed out is determined depending upon user authentication. In this embodiment, under what conditions a paper chart has been printed out is determined by appending (forming on the printed surface) a document identifier (e.g., a two-dimensional barcode, etc.) when a medical chart has been printed out as a paper medical chart.

More specifically, in FIG. 7, and by way of example, a document identifier (inclusive also of information that makes it possible to discriminate that the chart is electronic medical chart A) in a case where user 7100 has printed out electronic medical chart A and a document identifier in a case where user 7300 has printed out electronic medical chart A differ from each other. Such an identifier is appended. As a result, when a paper medical chart has been scanned, whether updating of the electronic medical chart by such scanning may be performed or not can be determined without performing user authentication.

Further, it may be so arranged that when an electronic medical chart is printed out, whether the printout is one for the purpose of editing or one for the purpose of viewing can be specified from the operating unit 1001, and it may be so arranged that each printout is furnished with a document identifier that makes it possible to distinguish it from the other. As a result, when a paper medical chart is scanned, updating of the electronic medical chart is allowed if a document identifier indicating that the purpose is editing has been attached to the chart, and updating of the electronic medical chart can be inhibited if a document identifier indicating that the purpose is view has been attached to the chart. In this case, printout of an electronic medical chart for the purpose of editing anew is inhibited until a paper medical chart for the purpose of editing is scanned.

In the embodiments described above, the storage of document data and operation history is performed within a multifunction peripheral. However, the invention is not limited to such an arrangement and the storage device may be a server computer, etc., installed on a network. In such case the scanning of the document and the issuance of operating instructions by the user would be performed by a multifunction peripheral and other operations would be performed by the server computer. Of course, operations such as the inputting and changing of document data may be performed by a computer terminal or the like without using a multifunction peripheral. Further, it may be so arranged that when document data is managed, the system executes character recognition processing, adds on text-coded information and conducts a search based upon a keyword.

Thus, by virtue of the foregoing embodiments, it is possible to manage document data in unified fashion, manage the document while maintaining consistency of the contents of the document, and do so while enabling various users to operate on the document.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-352332, filed on Dec. 6, 2005, which is hereby incorporated by reference herein in its entirety.

What is claimed is:

1. A document managing apparatus comprising:
an input unit adapted to scan-in an original print medium and, consequently, form document data;
a storage device adapted to store the document data;
a print designating unit adapted to cause an image, which represents the document data that has been stored in said storage device, to be printed on each of a plurality of different print mediums by a printing apparatus;
an updating unit adapted to update the document data, which has been stored in said storage device, by scanning-in a first print medium of the plurality of different print mediums ahead of the other of the plurality of different print mediums; and
a restricting unit adapted to restrict an update of the document data by said updating unit by scanning-in any of the other of the plurality of different print mediums after the updating unit has updated the document data based upon the scanned-in first print medium.

2. The apparatus according to claim 1, further comprising an authenticating unit adapted to authenticate a user who has performed an operation for designating printing using said print designating unit; and
a history holding unit adapted to hold a history of operations on the document data in association with information concerning the user who performed the operations;
wherein said restricting unit is adapted to restrict an update by said updating unit based upon the user authenticated by said authenticating unit and the history being held by said history holding unit.

3. The apparatus according to claim 2, wherein said history holding unit is adapted to manage the history of user operations on a per-identical-document basis.

4. The apparatus according to claim 2, wherein said history holding unit is adapted to hold a history of print operations on the document data by a first user; and
said restricting unit is adapted to restrict a print operation on the document data by a second user carried out before a scanning operation is performed by the first user.

5. The apparatus according to claim 2, wherein said history holding unit is adapted to hold a history of print operations on the document data by a first user and a history of print operations on the document data by a second user carried; and
said restricting unit is adapted to restrict updating of the document data, which has been stored by said storage device, by document data obtained by conversion by scanning of a document that has been printed out with respect to the first user.

6. The apparatus according to claim 2, wherein said history holding unit is adapted to hold a history of print operations on the document data by a first user, a history of print operations on the document data by a second user, and a history of updating of the document data, which has been stored by said storage unit, by document data obtained by conversion by scanning of a document that has been printed out with respect to the first user; and
said restricting unit is adapted to restrict a print operation on the updated document data by the second user.

7. A document management method comprising the steps of:

scanning-in an original print medium and, consequently, forming document data;

storing document data in a storage device;

causing an image, which represents the document data that has been stored at said storage step, to be printed on each of a plurality of different print mediums by a printing apparatus;

updating the document data, which has been stored at said storage step, by scanning-in a first print medium of the plurality of different print mediums ahead of the other of the plurality of different print mediums; and restricting an update of the document data at said updating step by scanning-in any of the other of the plurality of different print mediums after the updating unit has updated the document data based upon the scanned-in first print medium.

\* \* \* \* \*